United States Patent
Kadono

(10) Patent No.: US 6,959,043 B2
(45) Date of Patent: Oct. 25, 2005

(54) VIDEO DECODING METHOD, VIDEO DECODING APPARATUS, AND VIDEO DECODING PROGRAM STORAGE MEDIUM

(75) Inventor: Shinya Kadono, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 700 days.

(21) Appl. No.: 09/854,516

(22) Filed: May 15, 2001

(65) Prior Publication Data

US 2002/0051495 A1 May 2, 2002

(30) Foreign Application Priority Data

May 15, 2000 (JP) ........................... 2000-141699

(51) Int. Cl.[7] .............................................. H04N 7/12
(52) U.S. Cl. ............. 375/240.08; 375/240; 375/240.01; 375/240.12; 375/240.25
(58) Field of Search .......................... 375/240.08, 240, 375/240.01, 240.12, 240.25, 240.15; 382/236; 341/50; 345/418

(56) References Cited

U.S. PATENT DOCUMENTS 6,026,195 A * 2/2000 Eifrig et al. ................ 382/236
6,078,328 A * 6/2000 Schumann et al. .......... 345/418
6,081,208 A * 6/2000 Kikuchi et al. ............... 341/50
2002/0114392 A1 * 8/2002 Sekiguchi et al. ...... 375/240.15

OTHER PUBLICATIONS

"Information technology—Coding of audio-visual objects—", International Standard, ISO/IEC 14496-2, Dec. 1, 1999, pp. 29–38 and 83–87.

* cited by examiner

Primary Examiner—Allen Wong
(74) Attorney, Agent, or Firm—Wenderoth, Lind & Ponack, L.L.P.

(57) ABSTRACT

A video decoding apparatus exerts a control so as not to display unnatural pixel values when a stream having no pixel value but only shape values is decoded. A decoder decodes a video stream. When the video stream includes only the shape, object non-display information indicates "non display". Otherwise, the object non-display information indicates "display". When the object non-display information indicates "non display", a switch selects a shape value which does not display the color, obtained from a shape value generator. In other words, a shape value Aval indicating that this pixel is transparent and other videos are displayed as they are at composition.

10 Claims, 14 Drawing Sheets

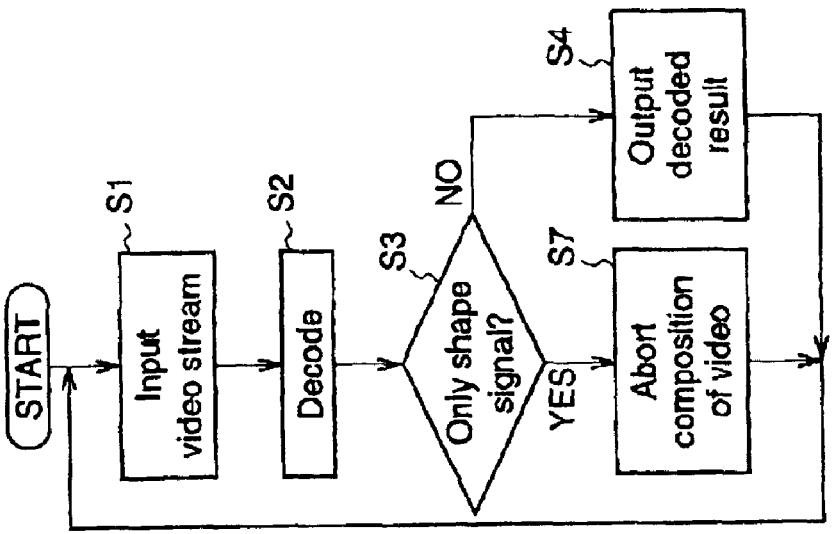
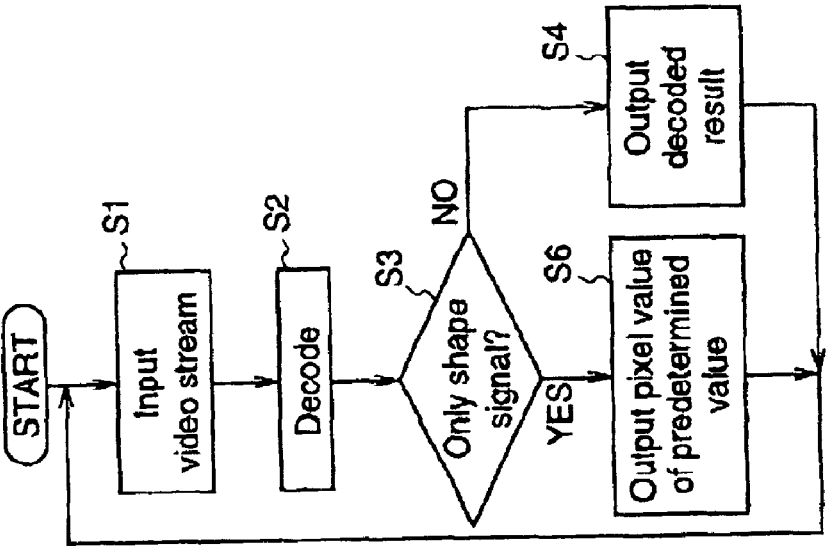
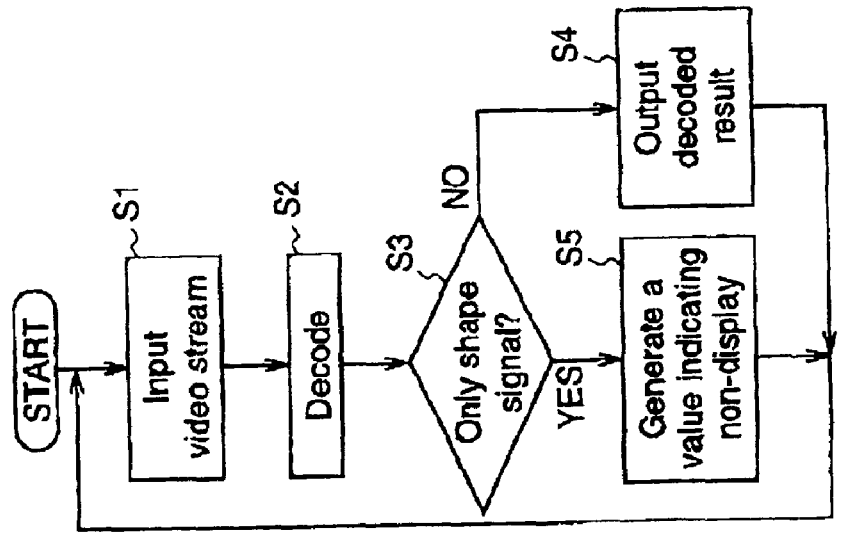

VIDEO DECODING METHOD, VIDEO DECODING APPARATUS, AND VIDEO DECODING PROGRAM STORAGE MEDIUM

FIELD OF THE INVENTION

The present invention relates to a video decoding method, a video decoding apparatus, and a video decoding program storage medium and, more particularly, to a video decoding method, a video decoding apparatus, and a video decoding program storage medium which are used to decode each video, in a video decoding system which decodes streams composed of plural videos (objects) and composes decoded videos to display the composed image.

BACKGROUND OF THE INVENTION

In recent years, we have greeted the age of multimedia in which audio, video, and other data are integrally handled, and the conventional information media, i.e., means for transmitting information between persons, such as newspapers, magazines, televisions, radios, and telephones, have been grasped as subjects of multimedia. Generally, "multimedia" does not mean only representing characters, but means representing especially images, simultaneously in relation with diagrams, speech, and the like. In order to adopt conventional information as information media as subjects of multimedia, it is required to represent the information in a digital form.

When the information quantity possessed by the respective information media described above are estimated as digital information quantity, the information quantity per character is 1–2 bytes, while the information quantity of more than 64 kbits per second (telecommunication quality) is required for audio and the information quantity of more than 100 Mbits per second (current television broadcasting quality) is required for moving picture. Therefore, it is not practical to handle such tremendous amounts of data of the above-described information media as they are in digital formats. For example, though visual phones have already been put to practical use by ISDN (Integrated Services Digital Network) having a transmission rate of 64 kbps~1.5 Mbps, it is impossible to transmit images of television cameras as they are by the ISDN.

In these circumstances, information compression techniques are required. For example, in the case of visual telephones, the moving picture compression techniques standardized as H.261 and H.263 by ITU-T (International Telecommunication Union-Telecommunication Sector) are employed. Further, according to the information compression technique of MPEG1, it is possible to contain video information together with audio information in an ordinary music CD (compact disk).

MPEG (Moving Picture Experts Group) is an international standard of data compression for a moving picture, i.e., pixel values of a moving picture. MPEG1 is a standard for compressing pixel values of a moving picture to 1.5 Mbps, i.e., data of a television signal to about 1/100. Further, while the transmission rate in MPEG1 is mainly limited to about 1.5 Mbps, in MPEG2 which is aimed at standardization to meet a request for a higher image quality, the limitation is relaxed with pixel values of a moving picture being compressed to 2~15 Mbps.

Further, under the existing circumstances, standardization of MPEG4 has been almost completed by the working group for standardization of MPEG1 and MPEG2 (ISO/IEC JTC1/SC29/WG11), which enables coding and handling in object units and realizes new functions demanded in the multimedia age. While MPEG4 has initially aimed at standardization of a coding method of a low bit rate, the aim of the standardization thereof is now extended to a more versatile coding process of a high bit rate or an interlaced image. One of characteristics of MPEG4 is coding simultaneously plural image sequences and transmitting the same. This enables one image scene to be composed of plural images. The foreground and the background can be different image sequences, and the frame frequency, the image quality and the bit rate thereof can be individually changed. Thereby, plural images can be arranged in the horizontal or vertical direction like in a multi-screen, and it is enabled for the user to extract or enlarging-display only a desired image. It is general that only pixel values are coded for the background similarly in MPEG2, while, as for the foreground, a pixel value signal indicating pixel values of the object as well as a shape signal indicating the shape of the object are coded. Commonly, the coding of the foreground are known as coding in object units. The displayed image is a video composed of the respective decoded images.

FIGS. 8(a)–8(f) are diagrams for explaining video composition in object units. FIG. 8(a) shows pixel values of a foreground video (hereinafter, simply referred to as foreground) fv1 of a balloon which composes a display video. FIG. 8(b) shows a shape value of a shape signal fm1 corresponding to the foreground fv1 in FIG. 8(a). FIG. 8(c) shows pixel values of a foreground fv2 of a human which composes the display video. FIG. 8(d) shows a shape value of a shape signal fm2 corresponding to the foreground fv2 in FIG. 8(c). FIG. 8(e) shows pixel values of a background video (hereinafter, simply referred to as background) rv. FIG. 8(f) shows the display video which is obtained by composing the foregrounds fv1 and fv2 of FIGS. 8(a) and 8(c) with the background rv of FIG. 8(e).

In the screens of the shape signals of FIGS. 8(b) and 8(d), parts painted black in the screens show areas in which the corresponding pixel values exist, i.e., inside an object, and white parts show areas in which no corresponding pixel values exist, i.e., outside the object. A wording that "a pixel value is significant/insignificant" is sometimes used in a sense that a pixel value exists/no pixel value exists.

FIG. 9 is a block diagram illustrating a structure of a prior art video decoding system. In this figure, reference DeMux denotes a stream demultiplexer for demultiplexing a multiplexed stream StrM. References Dec1, Dec2 and Dec3 denote decoders for decoding video streams Str1, Str2 and Str3 which have been demultiplexed by the stream demultiplexer DeMux, respectively. Reference Comp1 denotes a video composer for composing decoded videos Dout1, Dout2 and Dout3 which have been decoded by the decoders Dec1, Dec2 and Dec3, respectively. Reference Disp denotes a display unit for displaying a video Vcom which is composed by the video composer Comp1. Reference IF denotes an object selector for the user to select an object. CPU denotes a controller for controlling the decoders Dec1, Dec2 and Dec3 in accordance with the instruction of the object selector IF.

Next, the operation of the prior art video decoding system is described. A multiplexed stream StrM is demultiplexed by the stream demultiplexer DeMux into video streams Str1, Str2 and Str3 corresponding to videos of three objects, as well as overlap information Odr indicating the order of overlap of these videos which is sent to the controller CPU. The decoder Dec1 decodes the video stream Str1 and outputs the decoded video Dout1. Similarly, the decoders Dec2 and Dec3 decode the video streams Str2 and Str3, and output the decoded videos Dout2 and Dout3, respectively. The video composer Comp1 composes these decoded videos Dout1, Dout2 and Dout3 to provide a composed video Vcom, and displays the composed video on the display unit Disp.

On the other hand, in the case of object unit coding, the user can switch the display/non-display of videos in object units. The user selects the display or non-display of each object by means of the object selector IF. The object selector IF notifies the video composer Comp1 of object non-display information Dsel according to this selection, and the video composer Comp1 composes only videos of objects which should be displayed, to display the composed video.

With using the shape value of an object, it can be judged whether a position is inside or outside the object. Accordingly, by executing an operation of selecting a button Bn within the screen using a pointer Pr as shown in FIG. 10, it is possible that the user designates a specific position in the screen and obtains information as to whether the position is inside or outside an object. To be specific, the user moves the pointer by the object selector IF and selects a button, thereby notifying the controller CPU of object selection information Psel which indicates a designated pixel position. The controller CPU makes an inquiry to the decoders Dec1, Dec2 and Dec3 corresponding to the respective objects with object judge commands Q1, Q2 and Q3 about whether the designated position is inside or outside an object such as a button on the screen. The decoders Dec1, Dec2 and Dec3 report the controller CPU whether the inquired position is inside or outside the object by object judge results A1, A2 and A3, respectively, and then the controller CPU notifies the user or applications of the object judge results A1, A2 and A3 collectively as object judge result Req.

The block diagram of FIG. 9 illustrating the video decoding system shows an example where three videos are composed to obtain a composed video Vcom, while the number of videos to be composed can be less than three, or more than three. In addition, in this example, one decoder is provided for each video stream, while when plural video streams can be decoded by one video decoder by time division or the like, the number of video decoders can be properly reduced.

FIG. 11 is a block diagram illustrating a structure of the decoder Dec of the video decoding apparatus in the prior art video decoding system shown in FIG. 9. In this figure, a video stream Str, an object judge command Q, an object judge result A and a decoded video Dout correspond to one of the video streams Str1, Str2 and Str3, the object judge commands Q1, Q2 and Q3, the object judge results A1, A2 and A3, and the decoded videos Dout1, Dout2 and Dout3 in FIG. 9, respectively. Reference DecU denotes a video decoding unit for decoding the video stream Str. References MEM1, MEM2, MEM3 and MEM4 denote memories for containing decoded videos mem1, mem2, mem3 and mem4, respectively.

Next, the operation of the decoder Dec is described. In FIG. 11, the video decoding unit DecU decodes the video stream Str and stores the decoded videos mem1, mem2, mem3 and mem4 which are obtained by the decoding, into the memories MEM1, MEM2, MEM3 and MEM4, respectively. At this time, when the video stream Str has been inter-frame coded, the decoded videos mem1, mem2, mem3 and mem4 are read from the memories MEM1, MEM2, MEM3 and MEM4 to utilize the same as reference videos at the motion compensation. Since a signal of a video having the shape is composed of three components indicating the color (YUV, RGB or the like) and a shape value A, i.e., four components in total, the four individual memories are provided to correspond to the four components, respectively. However, when practically packaged, these can be integrated in one memory.

In the example shown in FIG. 11, the memories MEM1, MEM2, MEM3 and MEM4 contain a luminance pixel value Yimg, two color difference pixel values Uimg and Vimg, and a shape value Aimg, respectively. Since the shape value Aimg is stored in the memory MEM4, when a pixel position such as a position pointed by the pointer is indicated by the object judge command Q from the controller CPU in FIG. 9, the memory MEM4 judges whether that position is inside or outside the object, and outputs the result as the object judge result A. The decoded videos stored in the memories MEM1, MEM2, MEM3, and MEM4 are read as pixel decoded videos Yimg, Uimg and Vimg, and a shape decoded video Aimg at a timing of display, to obtain pixel decoded videos Yout, Uout and Vout, and a shape decoded video Aout, respectively. The decoded video Dout is obtained by combining the pixel decoded videos Yout, Uout and Vout and the shape decoded video Aout.

FIG. 12 is a diagram showing an internal structure of the memory MEM4 which contains the shape value. In this figure, reference MEM41 denotes a shape signal storage memory for containing the shape signal. Reference CMP denotes a pointed position comparison means for comparing and judging whether the pointer operated by the object selector IF in FIG. 9 points inside or outside of an object, such as a button.

Next, the operation of the memory MEM4 is described. In FIG. 12, the shape signal storage memory MEM41 contains the shape signal mem4 which has been decoded by the decoding unit DecU in FIG. 11 as a bitmap. The pointed position comparison means CMP converts pointed position information of the pointer operated by the object selector IF in FIG. 9, which is transmitted in accordance with the object judge command Q issued by the controller CPU in FIG. 11, together with this object judge command Q, into an address of the shape signal storage memory MEM41, and judges whether or not the bitmap of the shape signal exists at that address, thereby judging whether the position pointed by the pointer is inside or outside of the video of the object, such as a button. Then, the pointed position comparison means CMP outputs the judge result to the controller CPU in FIG. 9 as the object judge result A.

As described above, the information as to whether a position is inside or outside an object can be obtained by using the shape value of the object. By utilizing these workings, the shape value can be used as a GUI (Graphic User Interface) operable button whose shape varies. This is what is called a "hot spot", and, for example, when a certain position on the screen of a terminal (for example, assuming that this is a video in a form of a button) is clicked to make the terminal execute a special processing, a shape signal indicating that position is transmitted as a moving picture, thereby changing the position or shape of the button. For that purpose, not only videos including both of pixel values and shape values, but also videos having only shape values are effective, and accordingly the coding of only shape values can be also used in MPEG4.

For example, when FIG. 8(*f*) is used as background, only shape values of FIGS. 8(*b*) and 8(*d*) are coded, and a position is pointed in FIG. 8(*f*) by a pointer, the judgement as to whether that position is inside or outside the human or balloon can be made. Therefore, when only the judgement as to whether a position is inside or outside the video is to be made, the coding of individual pixel values of FIGS. 8(a), 8(c) and 8(e) is not required, and only the coding of the pixel value of FIG. 8(f) is required. Therefore, the coding/decoding process can be simplified, and in some cases the compression rate can be also increased by reduction of the number of pixels to be coded.

From the above descriptions, it can be seen that there are three kinds of the stream of color videos (moving pictures) in MPEG4, i.e., only YUV (color signals) in the case of videos whose shapes do not vary, YUV+A (a shape signal is added to the color signals) in the case where coding in object units is carried out, and only A (shape signal) in the case of judgement as to whether a position is inside or outside a video is made.

There are some cases where videos are transmitted according to MPEG1 and a shape signal according to MEPG4 is added thereto. Further, there is also a case where a texture is pasted on a shape signal transmitted according to MPEG4, whereby MPEG4 and CG (Computer Graphics) are combined to display color videos.

FIG. 13 is a diagram schematically showing the format of a video stream Str corresponding to a video of an object. In FIG. 13, reference HD denotes the header of the entire stream. References DA1, . . . , and DAX denote data of one screen, respectively. References HD1, . . . , and HDX denote headers corresponding to the screen data DA1, . . . , and DAX, respectively.

In the header HD of the entire stream, the video size (when the size of the video does not vary with frames) and the coding method (quantization method or information relating to arrangement of data) as well as information indicating a target which is being coded (above-mentioned YUV, YUV+A, A or the like), are coded and stored.

In the headers HD1, . . . , and HDX corresponding to the screen data DA1, . . . , and DAX, respectively, parameters required for the decoding, information indicating which frame is the corresponding video data or which is of I frame and P frame the video data, and the like are coded and stored.

FIG. 14 is a diagram showing a structure of a multiplexed stream StrM which is obtained by multiplexing plural video streams Str each corresponding to a video of an object. In the example shown in FIG. 14, the video streams Str are time-divided multiplexed frame by frame, and a header MHD including the overlap information Odr is arranged between the video streams Str.

As described above, it is useful to code only shape values, while when a stream including no pixel value but having only the shape value is received, what becomes the pixel value which is obtained by decoding this stream is not decided in the MPEG4 standard at the present time.

Originally, a stream having only the shape value is created provided that it is not displayed on the receiving end. However, since the measures to be taken when this is received and decoded are not defined in the MPEG4 standard, the stream having only the shape value should not be displayed, in accordance with proposals on the application side which utilizes video communication to provide information terminals with various kinds of services.

However, in many cases, video decoders created for general purposes are generally used for various applications to reduce developing costs, and these video decoders are designed to always decode and display transmitted information. Therefore, also when receiving a stream having only the shape value, the video decoder decodes this stream, and some pixel values which cannot be predicted are displayed due to that decoding, thereby giving wrong or unpleasant feelings to persons who watch the screen.

SUMMARY OF THE INVENTION

It is an object of the present invention to provide a video decoding method, a video decoding apparatus and a video decoding program storage medium which can prevent screen display of unpredictable pixels when streams having only shape values are received.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a video decoding method for receiving a stream including at least one of information obtained by coding pixel values which compose a video and information obtained by coding shape values indicating whether the pixel values which compose the video are significant or not, and outputting at least one of the pixel values and the shape values, which are respectively obtained by decoding the stream, comprising: judging whether or not the stream includes the information obtained by coding the pixel values which compose the video; and not displaying decoded pixel values on a video display unit, when the stream does not include any information which is obtained by coding the pixel values. Therefore, when a stream having no pixel value but only shape values is input, the video can be automatically controlled not to be displayed. This can be realized by using the common video decoding method which can be used for various applications, thereby providing a highly useful video decoding method which can avoid unexpected displays of unnatural pixel values occurring when the stream having only the shape values is decoded.

According to a 2nd aspect of the present invention, the video decoding method of the 1st aspect comprises: converting the decoded shape values into shape values which are not displayed to output the same, when the stream does not include any information obtained by coding the pixel values. Therefore, when a stream having no pixel value but only shape values is input, the video can be automatically controlled not to be displayed. This can be realized by using the common video decoding method which can be used for various applications, thereby providing a highly useful video decoding method which can avoid unexpected displays of unnatural pixel values occurring when the stream having only the shape values is decoded.

According to a 3rd aspect of the present invention, there is provided a video decoding method for receiving a stream including at least one of information obtained by coding pixel values which composes a video and information obtained by coding shape values indicating whether the pixel values which composes the video are significant or not, and outputting at least one of the pixel values and the shape values, which are respectively obtained by decoding the stream, comprising: outputting predetermined values as the decoded pixel values, when the stream does not include any information obtained by coding the pixel values. Therefore, when a stream having no pixel value but only shape values is input, the video of a natural pixel value can be automatically displayed. This can be realized by using the common video decoding method which can be used for various applications, thereby providing a highly useful video decoding method which can avoid unexpected displays of unnatural pixel values being displayed when the stream having only the shape values is decoded.

According to a 4th aspect of the present invention, the video decoding method of the 1st aspect comprises: outputting a signal which inhibits displaying the decoded result on the video display unit, when the stream does not include any information which is obtained by coding the pixel values. Therefore, when a stream having no pixel value but only shape values is input, the video can be automatically controlled not to be displayed. This can be realized by using the common video decoding method which can be used for various applications, thereby providing a highly useful video decoding method which can avoid unexpected displays of unnatural pixel values occurring when the stream having only the shape values is decoded.

According to a 5th aspect of the present invention, in the video decoding method of the 1st aspect, the video is one of videos of objects which compose a foreground with respect to a background. Therefore, when the common video decoding method which can be used for various applications is used as a video decoding method for a video stream which has been subjected to the video coding in object units, a highly useful video decoding method is provided which can avoid unexpected displays of unnatural pixel values occurring when the stream having only shape values is decoded.

According to a 6th aspect of the present invention, there is provided a video decoding method for receiving a stream including at least one of information obtained by coding pixel values which composes a video and information obtained by coding shape values indicating whether the pixel values which compose the video are significant or not, and handling the stream, comprising: judging whether or not the stream includes the information obtained by coding the pixel values which composes the video; and not decoding the stream, when the stream does not include any information which is obtained by coding the pixel values. Therefore, when a stream having no pixel value but only shape values is input, the video can be automatically controlled not to be displayed. This can be realized by using the common video decoding method which can be used for various applications, thereby providing a highly useful video decoding method which can avoid unexpected displays of unnatural pixel values occurring when the stream having only the shape values is decoded.

According to a 7th aspect of the present invention, there is provided a video decoding apparatus comprising: a video decoder for receiving a stream including at least one of information obtained by coding pixel values which composes a video and information obtained by coding shape values indicating whether the pixel values which compose the video are significant or not, and outputting at least one of pixel values and shape values, which are respectively obtained by decoding the stream; and a display controller for judging whether or not the stream includes the information obtained by coding the pixel values which compose the video, and exerting a control not to display the pixel values as the output of the video decoder, when the stream does not include any information which is obtained by coding the pixel values. Therefore, when a stream having no pixel value but only shape values is input, the video can be automatically controlled not to be displayed. This can be realized by using the common video decoding method which can be used for various applications, thereby providing a highly useful video decoding method which can avoid unexpected displays of unnatural pixel values occurring when the stream having only the shape values is decoded.

According to an 8th aspect of the present invention, in the video decoding apparatus of the 7th aspect, the video is one of videos of objects which compose a foreground with respect to a background. Therefore, when the common video decoding method which can be used for various applications is used as a video decoding method for a video stream which has been subjected to the video coding in object units, a highly useful video decoding method is provided which can avoid unexpected displays of unnatural pixel values occurring when the stream having only shape values is decoded.

According to a 9th aspect of the present invention, there is provided a video decoding program storage medium which contains a video decoding program implementing a video decoding method for receiving a stream including at least one of information obtained by coding pixel values which compose a video and information obtained by coding shape values indicating whether the pixel values which compose the video are significant or not, and outputting at least one of pixel values and shape values, which are respectively obtained by decoding the stream, and this video decoding program implementing the video decoding method comprises: judging whether or not the stream includes the information obtained by coding the pixel values which compose the video; and not displaying decoded pixel values on a video display unit, when the stream does not include any information which is obtained by coding the pixel values. Therefore, when a stream having no pixel value but only shape values is input, the video can be automatically controlled not to be displayed. This can be realized by using the common video decoding program which can be used for various applications, thereby providing a highly useful video decoding program storage medium which can avoid unexpected displays of unnatural pixel values occurring when the stream having only the shape values is decoded.

According to a 10th aspect of the present invention, in the video decoding program storage medium of the 9th aspect, the video is one of videos of objects which compose a foreground with respect to a background. Therefore, when the common video decoding program which can be used for various applications is used as a video decoding program for a video stream which has been subjected to the video coding in object units, a highly useful video decoding program storage medium is provided which can avoid unexpected displays of unnatural pixel values occurring when the stream having only shape values is decoded.

BRIEF DESCRIPTION OF THE DRAWINGS

FIGS. 7(a)–7(c) are flowcharts showing a video decoding method which is executed by a video decoding program storage medium according to a fourth embodiment of the present invention.

DETAILED DESCRIPTION OF THE PREFERRED EMBODIMENTS

Hereinafter, embodiments of the present invention will be described with reference to FIGS. 1 to 6.

[Embodiment 1]

Figure 1:
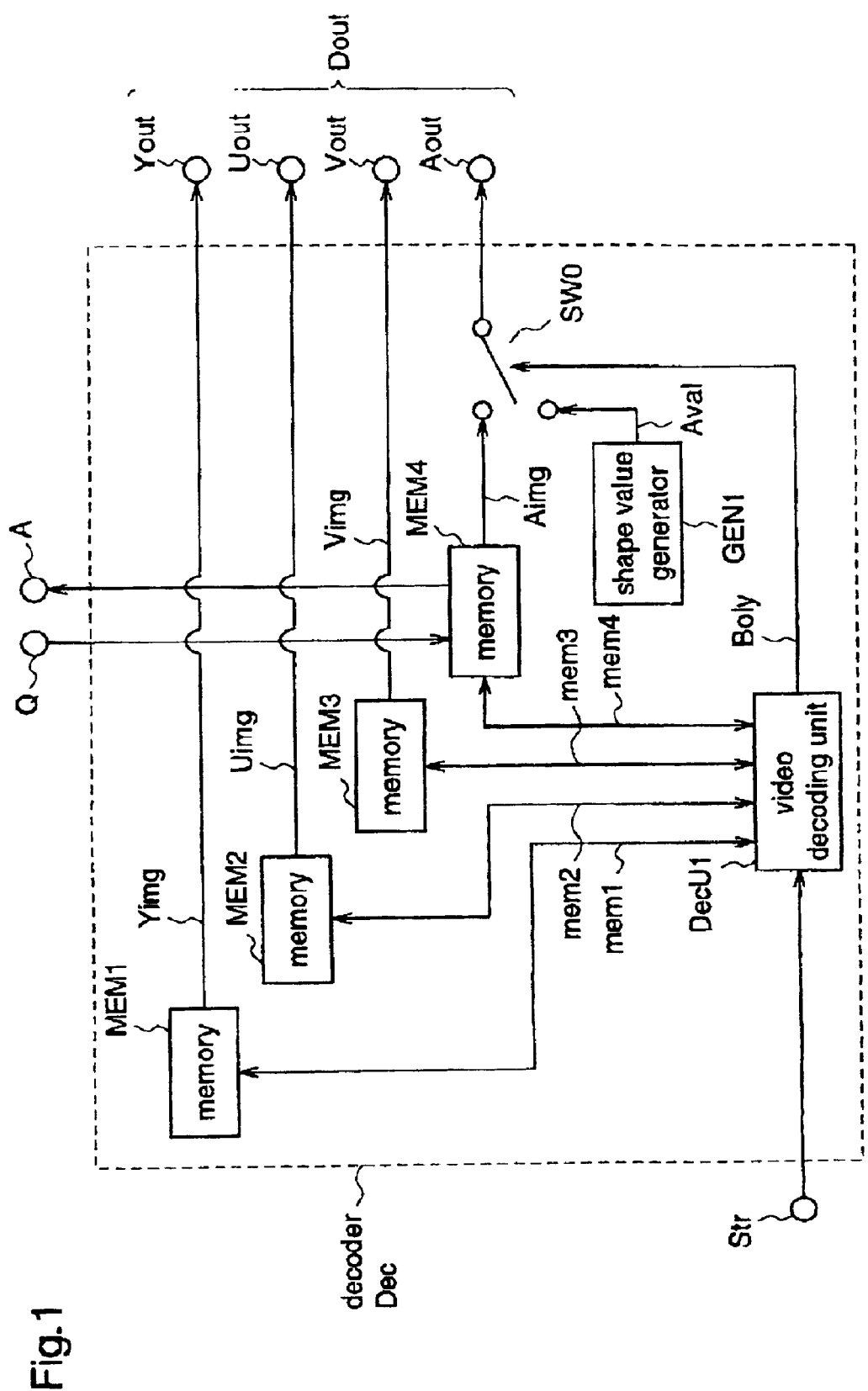
FIG. 1 is a block diagram illustrating a structure of a video decoder according to a first embodiment of the present invention.
Figure 11:
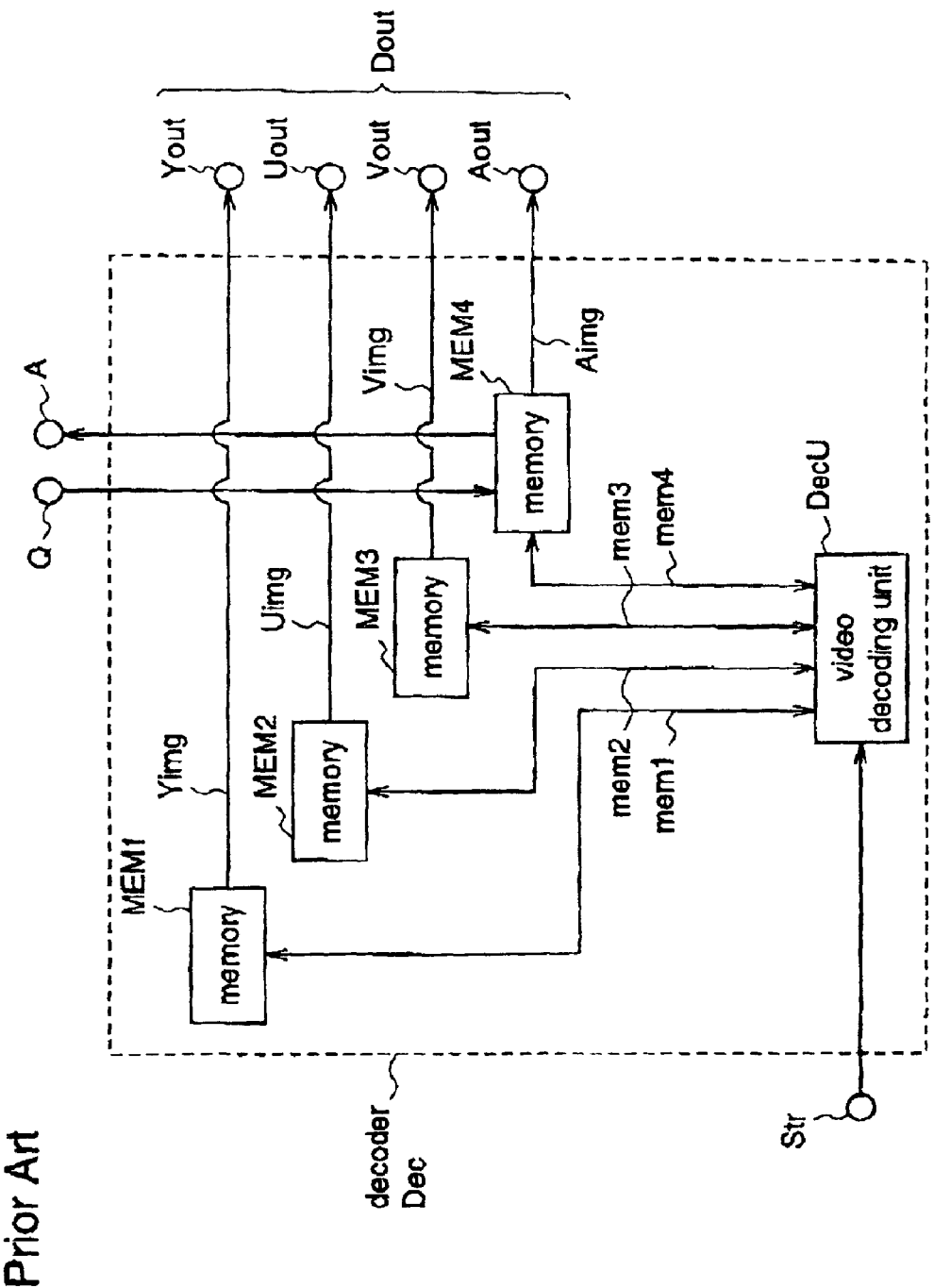
FIG. 11 is a block diagram illustrating a prior art video decoder.
Figure 12:
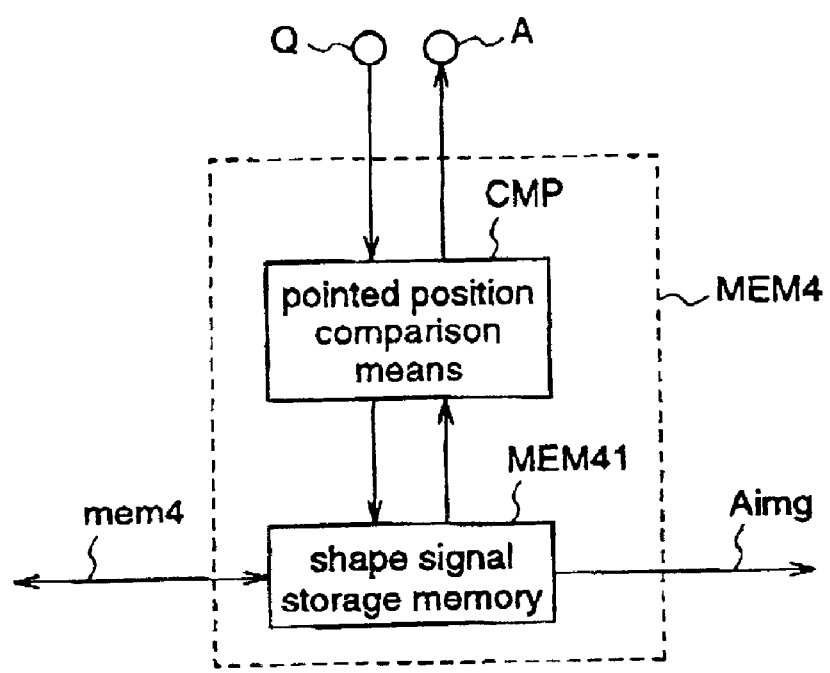
FIG. 12 is a block diagram illustrating a shape signal storage memory of the prior art video decoder.

FIG. 1 is a block diagram illustrating a structure of a video decoder according to the first embodiment of the present invention. In FIG. 1, the same references as those in FIG. 11 denote the same or corresponding parts. This video decoder is different from the prior art video decoder in that when a stream having only a shape value is received, object non-display information Boly is output from a video decoding unit DecU1 and that a shape value generator GEN1 and a switch SW0 are added thereto. Other structure is the same as that of the prior art video decoder in FIG. 11.

Next, the operation of the video decoder of the first embodiment is described. The video decoding unit DecU1 carries out decoding of the video stream Str in the same manner as that of the video decoding unit DecU in FIG. 11. When a code to be decoded is a predictive code, the memories MEM1, MEM2, MEM3 and MEM4 are referred to as required. Then, when the video stream Str includes no color component but only the shape, the decoding unit DecU1 outputs a value indicating "non display" as the object non-display information Boly, and otherwise outputs a value indicating "display".

Figure 13:
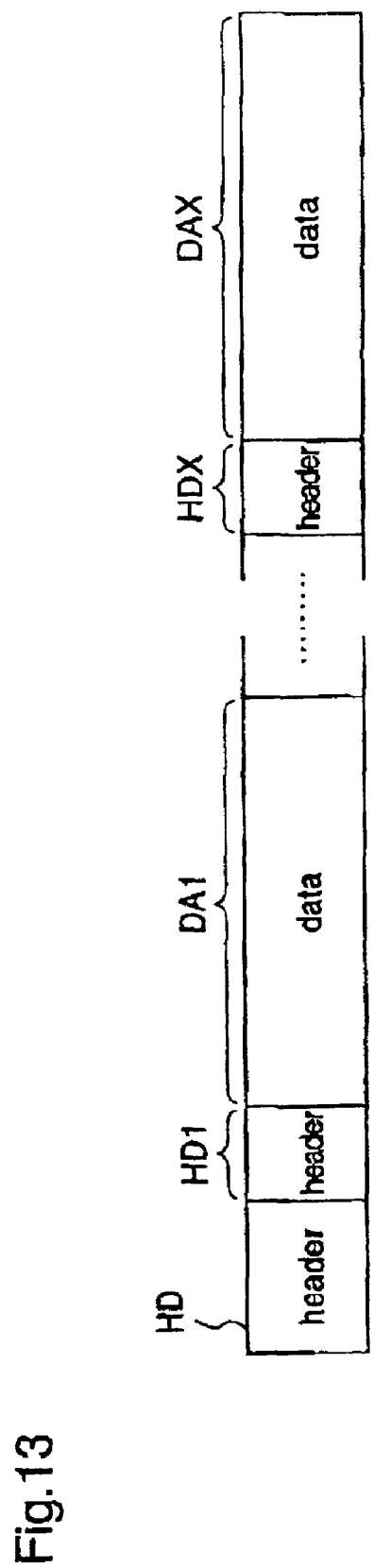
FIG. 13 is a diagram for explaining a format of a video stream.

This object non-display information Boly is generated in the video decoding unit DecU1, attendant upon decoding of a packet header HD which includes information of a coded target in a process when the video decoding unit DecU1 decodes original video data DA1 to DAX shown in FIG. 13. Therefore, the video decoding unit DecU1 requires no addition of specific hardware to the prior art video decoding unit DecU, to output this object non-display information Boly.

The shape value generator GEN1 is constituted by a constant generator, and generates a shape value Aval for displaying no color, i.e., indicating that this pixel is transparent and other videos are displayed as they are at the video composition, to always output the shape value. The switch SW0 selects the shape value Aval from the shape value generator GEN1 as the shape decoded video Aout when the object non-display information Boly from the video decoding unit DecU1 indicates "non display", and selects the shape decoded video Aimg from the memory MEM4 as the shape decoded video Aout when the object non-display information Boly indicates "display".

As described above, when the video stream Str includes no color component but only the shape, a value corresponding to non-display is output as the shape decoded video Aout, in place of an unexpected pixel value from the video decoding unit DecU1.

Figure 9:
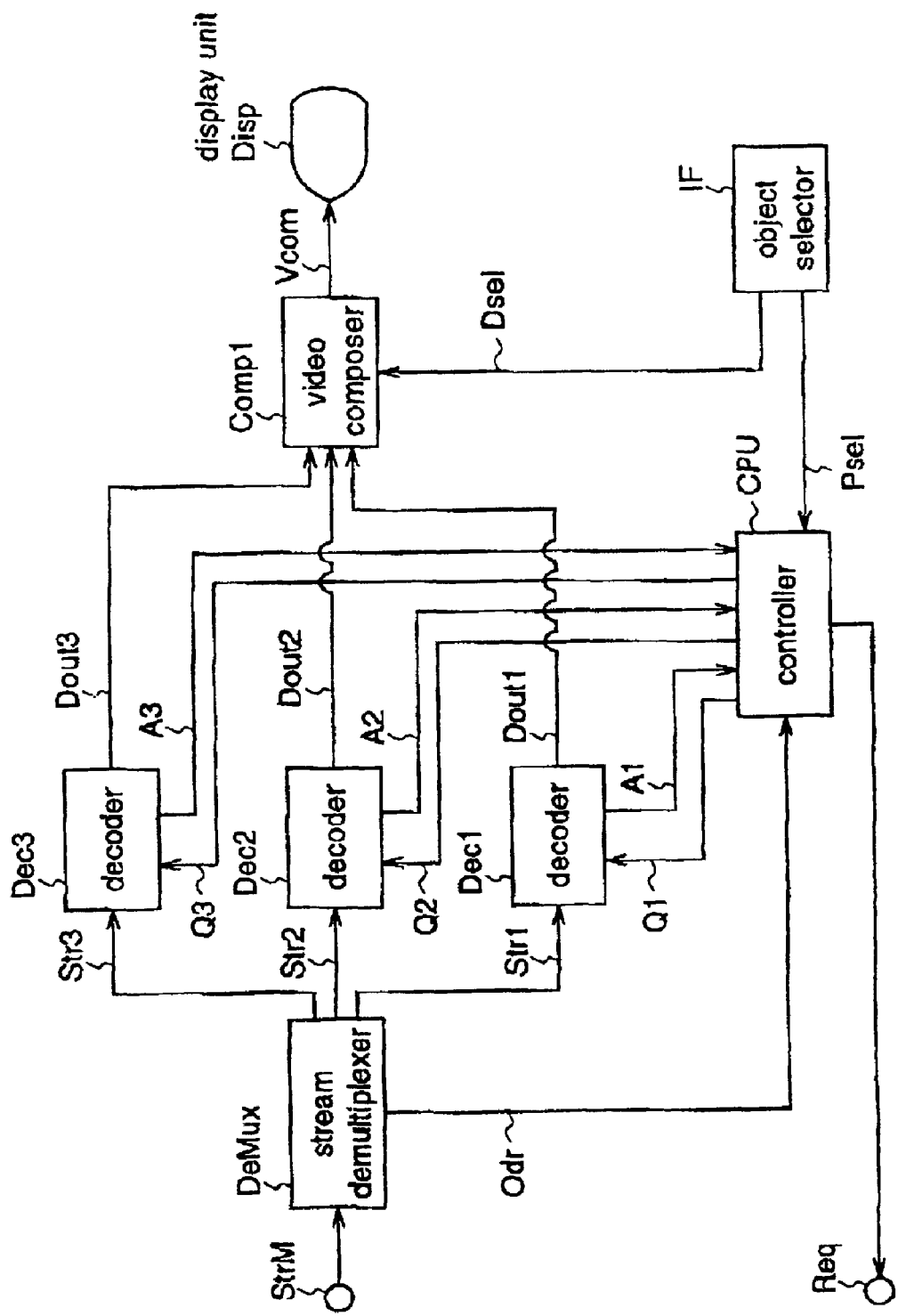
FIG. 9 is a block diagram illustrating a prior art video decoding system.
Figure 10:
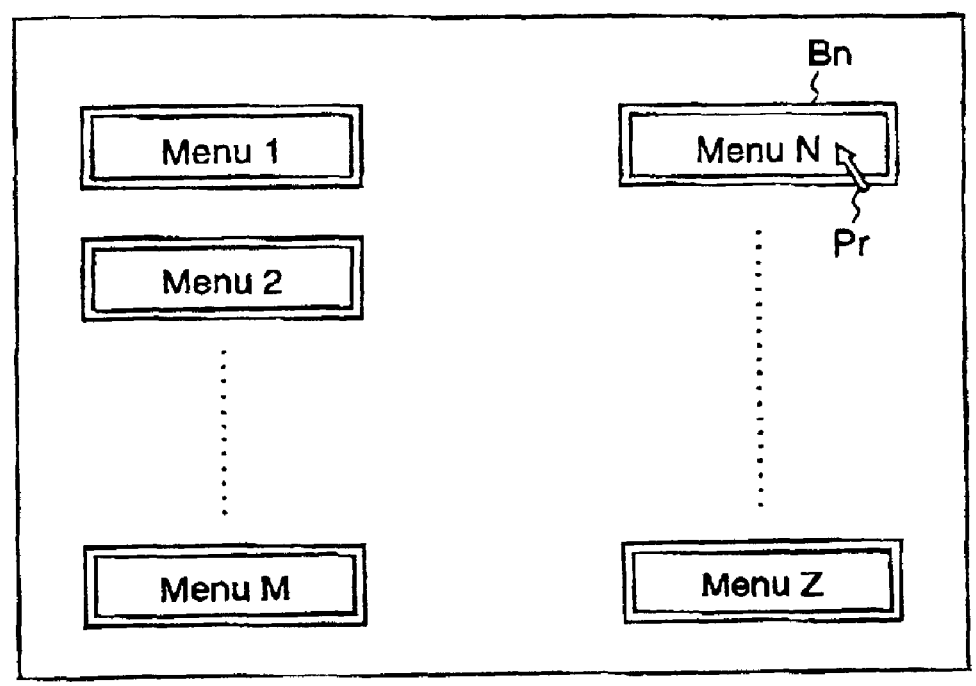
FIG. 10 is a diagram showing an example of point designation by a pointer.

Therefore, when the video decoder according to the first embodiment shown in FIG. 1 is used as the decoder Dec of the video decoding system in FIG. 9, a video stream having only the shape can be displayed to be transparent when the video composition is carried out. Accordingly, a video decoder which, even when a video having only the shape value has been transmitted, can automatically switch this video not to be displayed, without displaying unnatural color pixel values depending on the decoding process, can be obtained only by adding some hardware to the general-purpose video decoder.

[Embodiment 2]

Figure 2:
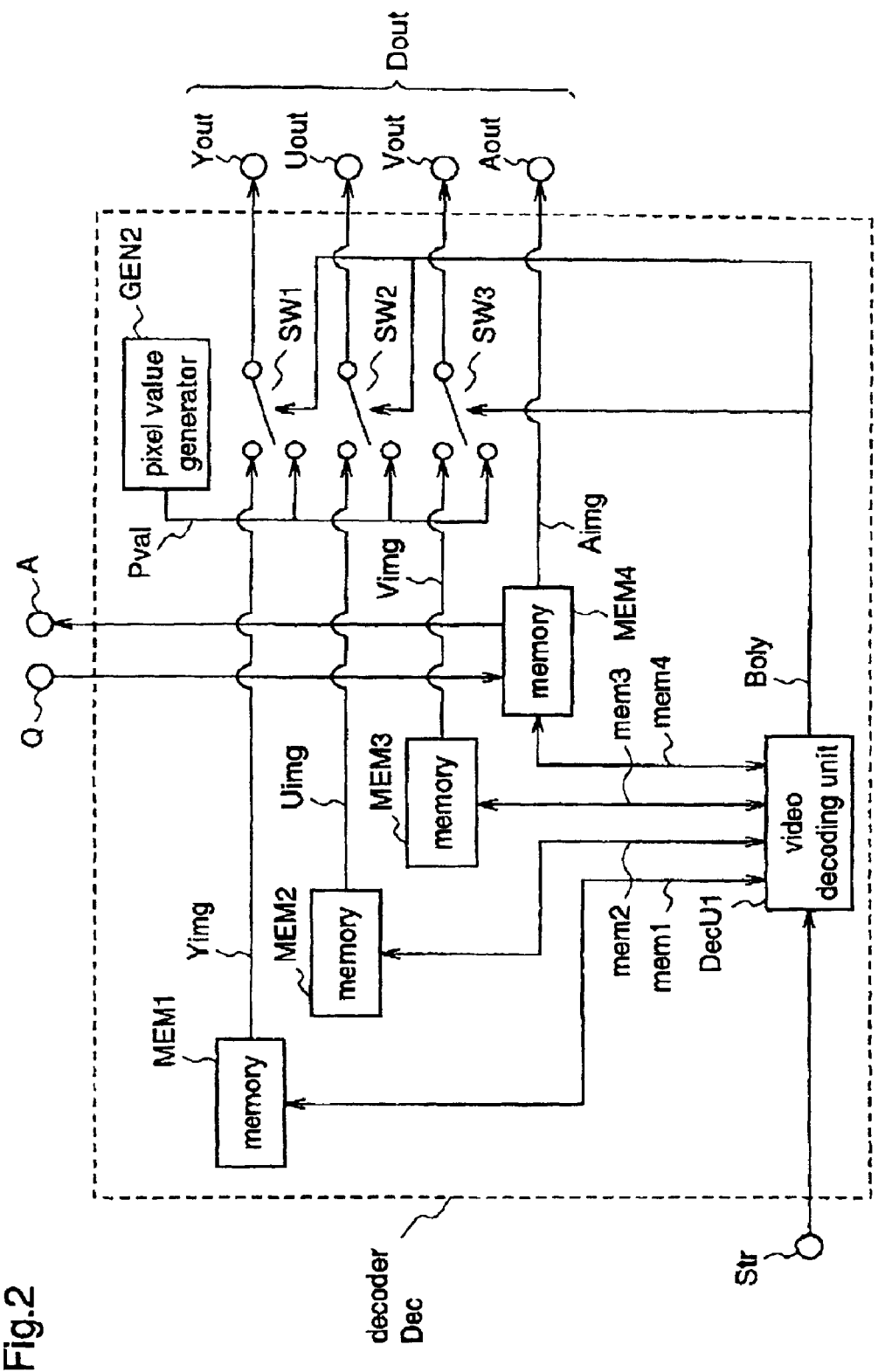
FIG. 2 is a block diagram illustrating a structure of a video decoder according to a second embodiment of the present invention.

FIG. 2 is a block diagram illustrating a video decoder according to the second embodiment of the present invention. As shown in this figure, the video decoder of the second embodiment is different from the prior art video decoder in FIG. 11 or the video decoder of the first embodiment in FIG. 1 in that a pixel value generator GEN2 and switches SW1, SW2 and SW3 are added in place of the shape value generator GEN1 and the switch SW0 in FIG. 1. The operations of other elements are the same as those in the prior art video decoder shown in FIG. 11.

According to the first embodiment, when a stream of a video having only the shape is input, that video is not displayed. However, it is also possible to adopt an approach that when a stream of a video having only the shape is input, a predetermined color pixel value is displayed, whereby an unnatural color pixel value which cannot be predicted by a creator (data creator) or data transmitter is prevented from being displayed.

In this second embodiment, this approach is adopted, and when a non-unnatural color pixel value such as gray value is preset as the predetermined color pixel value, a video stream having only the shape is displayed as a gray video having the shape, whereby this can be utilized as a means for providing the shape of the input stream without giving wrong feelings to the user.

In FIG. 2, the pixel value generator GEN2 is constituted by a constant generator for generating a constant which can be preset, and it generates a predetermined pixel value Pval such as the above-mentioned gray value and always outputs the same. When the object non-display information Boly indicates "non display", the switches SW1, SW2 and SW3 select the pixel value Pval from the pixel value generator GEN2, and output the same as the pixel decoded videos Yout, Uout and Vout, respectively. Conversely, when the object non-display information Boly indicates "display", the switches SW1, SW2 and SW3 output the pixel decoded videos Yimg, Uimg and Vimg, which have been decoded by the video decoding unit DecU1 and are output from the memories MEM1, MEM2 and MEM3, as the pixel decoded videos Yout, Uout and Vout, respectively.

As described above, when the video stream Str includes no color component but only the shape, the predetermined color pixel value such as gray is output as the shape decoded video Aout, in place of the unexpected pixel value from the decoder Dec1.

Therefore, when the video decoder in FIG. 2 is used in place of the decoder Dec of the video decoding system in FIG. 9, even when a video having only the shape value is transmitted, this video can be automatically switched to video display having the predetermined color, only by adding some hardware such as the pixel generator and switches to the general-purpose video decoder, thereby realizing the video decoder which can also execute easily the display of an object when it is judged whether a position pointed by the pointer is situated inside or outside of the video of the object.

When a texture of CG is pasted on a video having only the shape, the pixel value of the texture can be also used as the pixel value Pval which is to be generated by the pixel value generator GEN2. In this case, a decoded video Dout on which the texture has been pasted can be obtained, whereby an extra operation for pasting the texture is dispensed with.

As described above, when a stream of a video having only the shape is input, a predetermined color signal can be displayed, and even when the stream of the video having only the shape is input, the video quality interference due to the display of unexpected pixel values can be avoided by presetting a non-unnatural pixel value.

[Embodiment 3]

Figure 3:
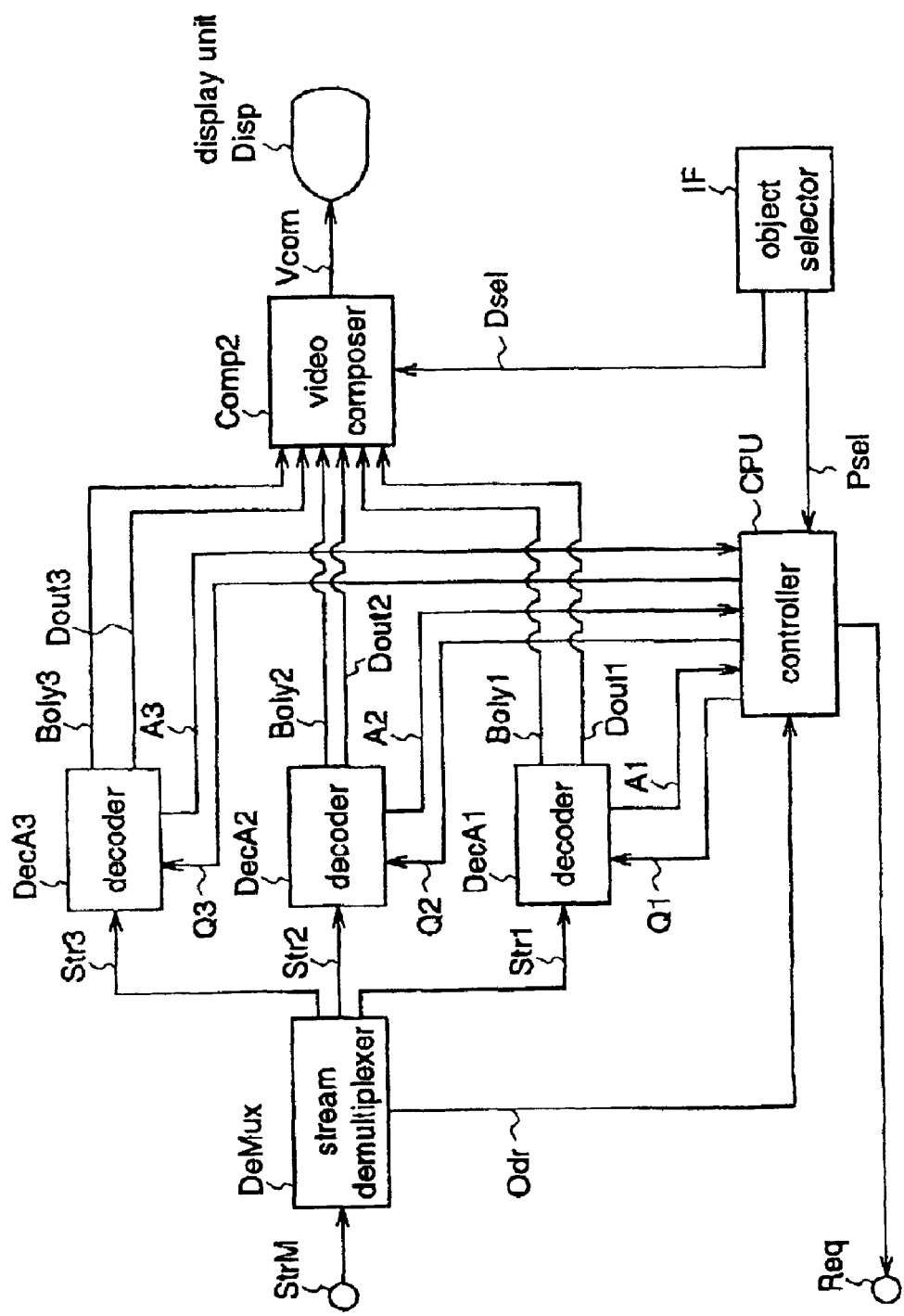
FIG. 3 is a block diagram illustrating a structure of a video decoding system according to a third embodiment of the present invention.

FIG. 3 is a block diagram illustrating a structure of a video decoding system according to the third embodiment of the present invention. The video decoding system of the third embodiment is obtained by replacing the decoders Dec1, Dec2 and Dec3 of the prior art video decoding system in FIG. 9 with decoders DecA1, DecA2 and DecA3 for outputting object non-display information Boly1, Boly2 and Boly3 instructing the presence or absence of display, together with decoded video information Dout1, Dout2 and Dout3, respectively.

In the first embodiment, when a video stream having only the shape is input, the processes are carried out only inside the decoders. However, when workings of referring to the object non-display information Boly1, Boly2 and Boly3 which indicate whether the respective videos are displayed or not, and non-displaying of the object when the information instructs "non display" by means of a video composer Comp2 are introduced into the video composer, the same effects as those in the first embodiment can be realized.

Figure 4:
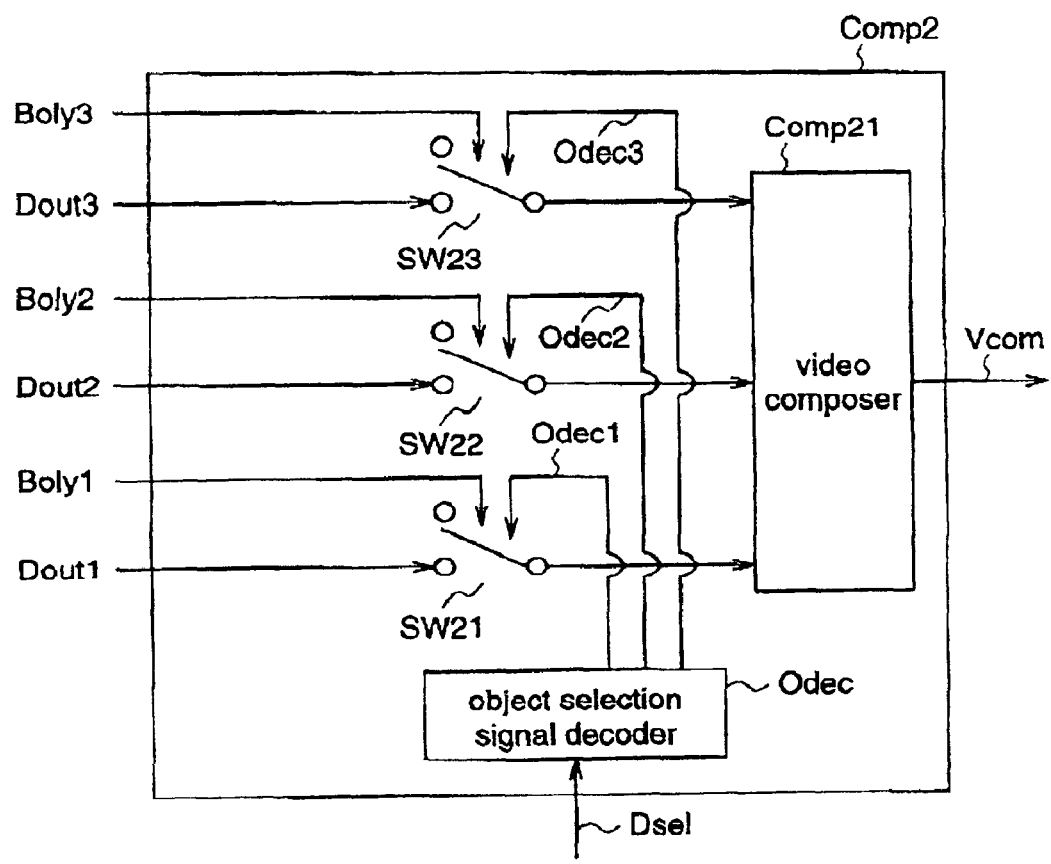
FIG. 4 is a block diagram illustrating a structure of a video composer of the video decoding system of the third embodiment.

FIG. 4 is a diagram illustrating a structure of the video composer Comp2 shown in FIG. 3. In this figure, reference Comp21 denotes a video composer for composing decoded video information Dout1, Dout2 and Dout3. Reference Odec denotes an object selection signal decoder for decoding the object selection signal Dse1 from the object selector IF in FIG. 3. References SW21, SW22 and SW23 denote switches which turn on and off in accordance with decoded signals Odec1, Odec2 and Odec3 from the object selection signal decoder Odec and the object non-display information Boly1, Boly2 and Boly3, respectively.

Next, the operation of the video composer is described. In FIG. 4, the switches SW21, SW22 and SW23 operate in accordance with the object non-display information Boly1, Boly2 and Boly3 which is output by the decoders DecA1, DecA2 and DecA3 in FIG. 3, respectively. When the object non-display information Boly1, Boly2 and Boly3 indicates "display", the switches are turned on, and when the information indicates "non display", the switches are turned off. Then, among the decoded outputs Dout1, Dout2 and Dout3 from the decoders DecA1, DecA2 and DecA3, the one for which the object non-display information indicates "non display" is not input to the video composer Comp21. Thereby, as for the signal having only the shape, the video composition is not performed. Similarly, when an object to be displayed is selected by the object selector IF in FIG. 3, the object selection signal decoder Odec selects the object selection signal Dsel from the object selector IF, and the switches 21, 22 and 23 are turned on only when the decoding results Odec1, Odec2 and Odec3 indicate "selection", whereby only the decoded output of the object which is to be displayed is input to the video composer Comp21.

Figure 5:
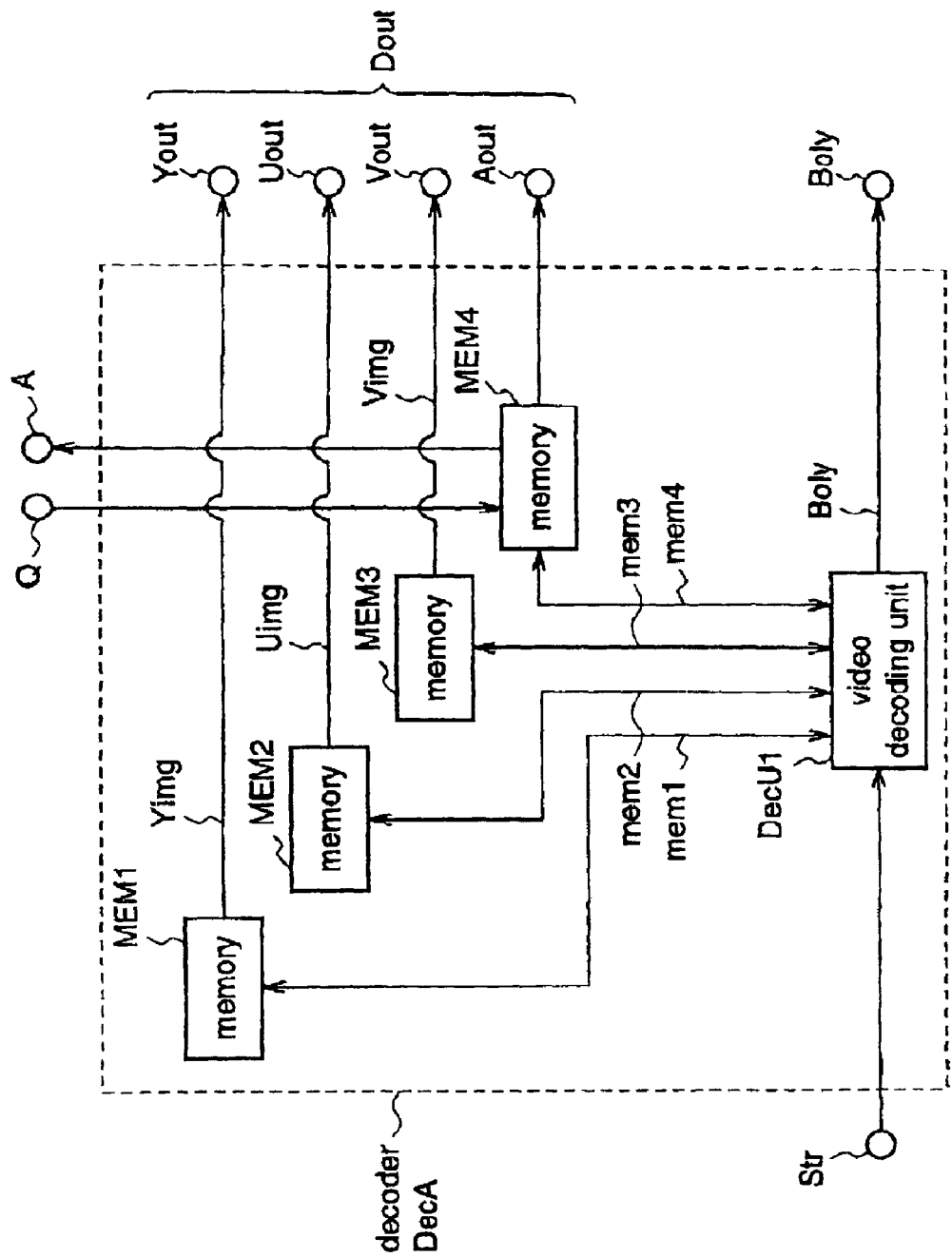
FIG. 5 is a block diagram illustrating a structure of a video decoder of the video decoding system of the third embodiment.
Figure 6:
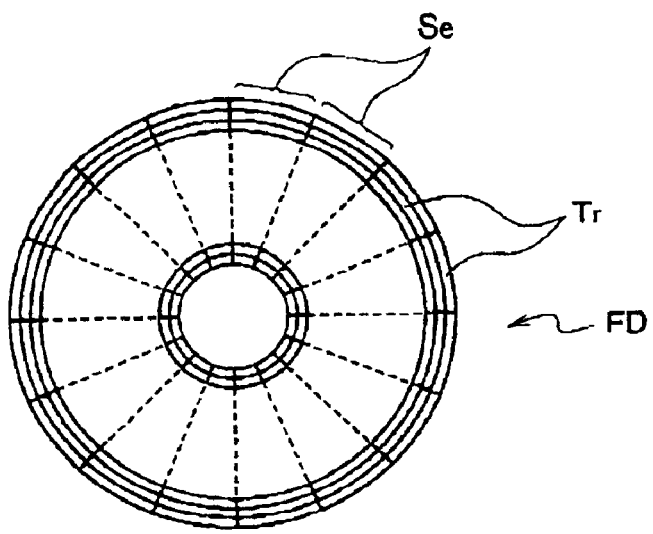
FIGS. 6(a)–6(c) are diagrams for explaining a storage medium which contains a program for implementing any of the first to third embodiments by a computer system.
Figure 6:
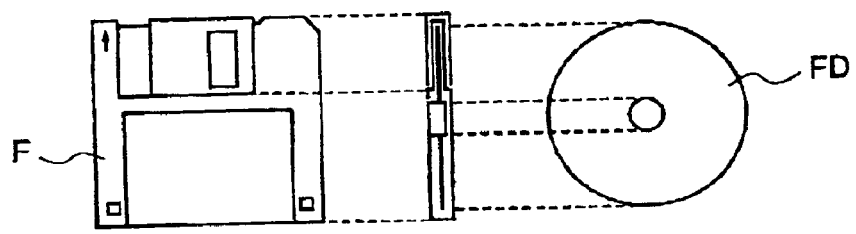
Figure 6:
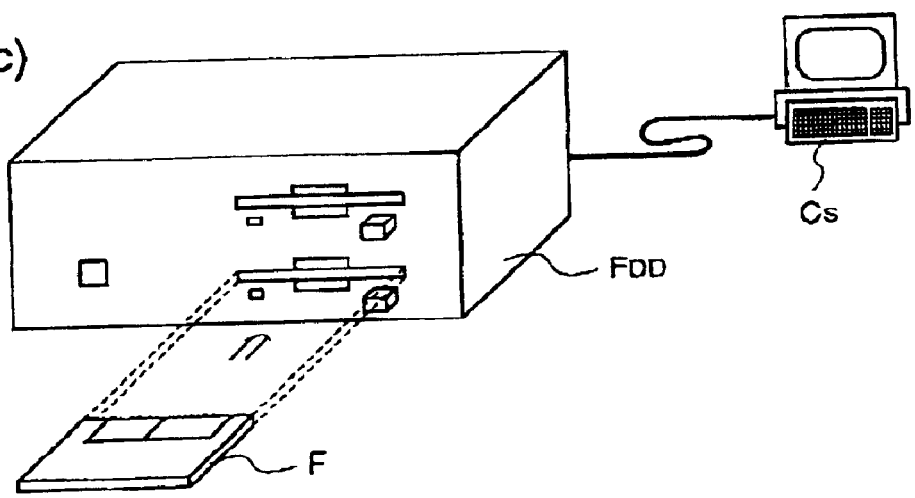
Figure 8:
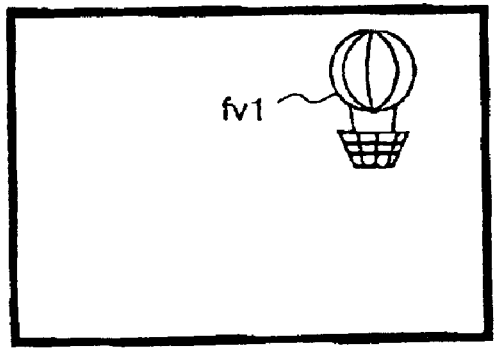
FIGS. 8(a)–8(f) are diagrams for explaining video composition in object units.
Figure 8:
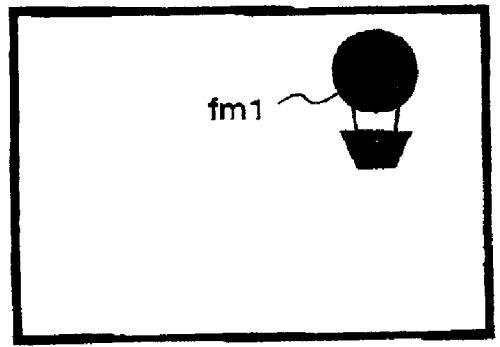
Figure 8:
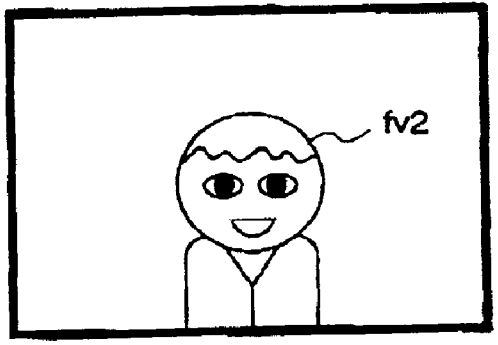
Figure 8:
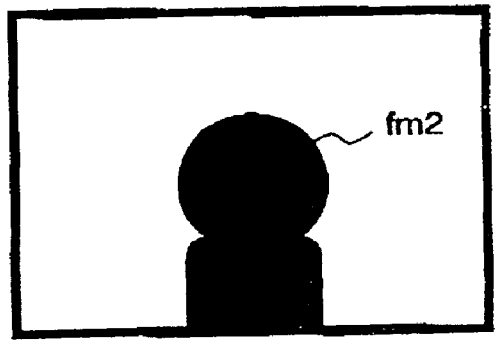
Figure 8:
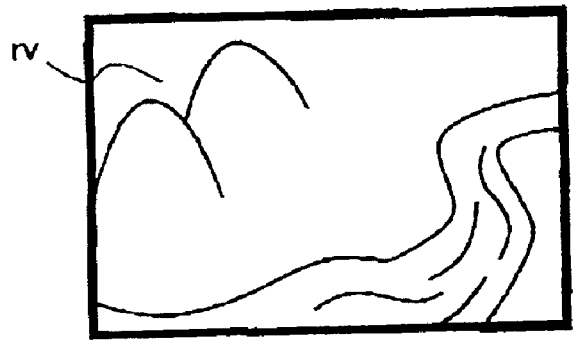
Figure 8:
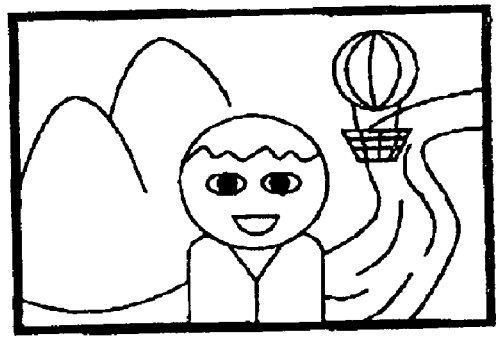

FIG. 5 is a diagram illustrating an example of the decoder DecA which constitutes the decoders DecA1, DecA2 and DecA3. In this figure, the same references as those in the video decoder in FIG. 1 denote elements which work in the same way. The video decoder of the first embodiment shown in FIG. 1 is different from the video decoder of the third embodiment shown in FIG. 5 only in that the latter has no shape value generator GEN1 and no switch SW0. When the decoders corresponding to three objects receive only the shape value, respectively, the decoders merely output a control signal which inhibits composition of the objects to the video composer. Therefore, the operation thereof is obvious without being specifically described. Further, similarly to the first embodiment, it goes without saying that the number of objects or decoders can be properly changed.

As described above, in the case of a video stream having only the shape, the video decoder outputs the object non-display information Boly which inhibits the display, and the video composer Comp2 inhibits the composition display of the object in accordance with the object non-display information Boly, thereby preventing composition and display of unnatural pixel values in the case where the video stream having only the shape is input.

[Embodiment 4]

Figure 14:
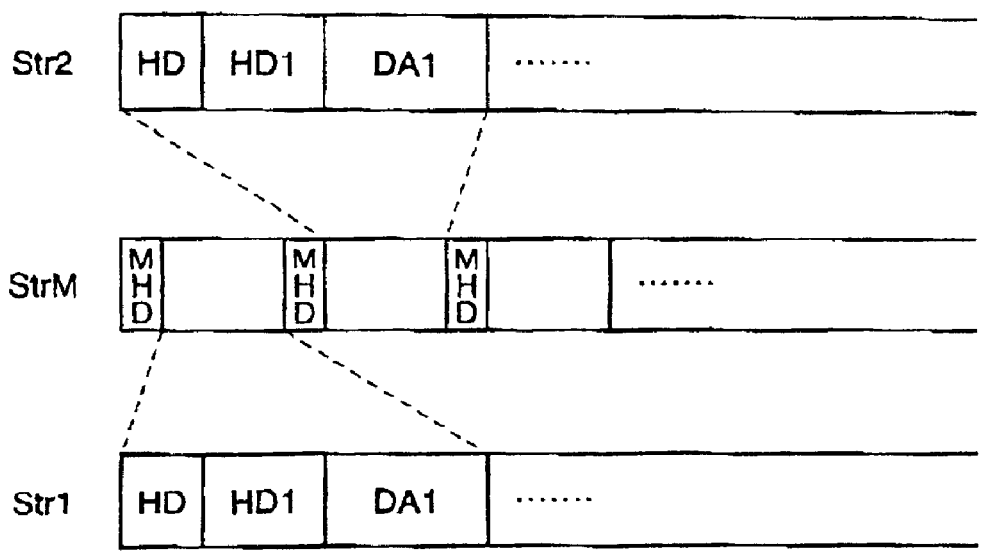
FIG. 14 is a diagram showing an example of a format of a multiplexed stream, and the relationship between the multiplexed stream and plural streams each corresponding to an object.
Figure 15:
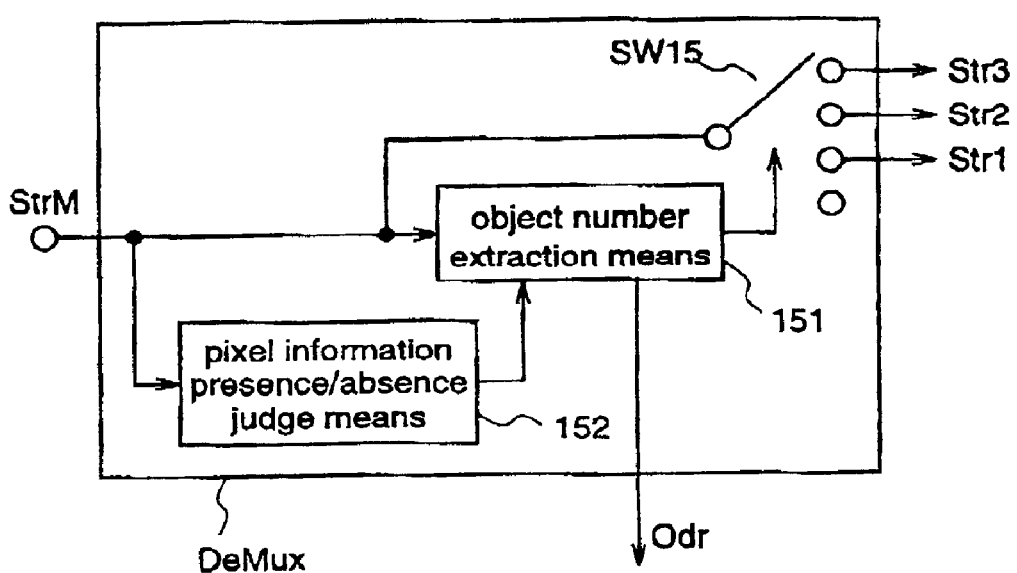
FIG. 15 is a diagram illustrating a structure of a stream demultiplexer DeMux of the video decoding system of the fourth embodiment.

FIG. 15 is a diagram illustrating a structure of a stream demultiplexer DeMux of a video decoding system according to the fourth embodiment of the present invention. In this figure, numeral 151 denotes an object number extraction means for reading overlap information Odr included in MHD of the multiplexed stream StrM as shown in FIG. 14 as well as extracting the object number of a stream which is subsequent to MHD. Numeral 152 denotes a pixel information presence/absence judge means for looking at the header HD of an entire stream which is obtained by multiplexing plural streams to judge whether each of the streams includes pixel information or not.

Next, the operation of the stream demultiplexer DeMux is described. The video decoding system of the fourth embodiment judges whether a target stream in a step of demultiplexing a multiplexed stream StrM into plural streams includes pixel information or not, and does not output a stream including no pixel information, i.e., a video stream having only the shape, to the decoder Dec in the next stage. When the multiplexed stream StrM as shown in FIG. 14 is input to the stream demultiplexer DeMux shown in FIG. 15, the pixel information presence/absence judge means 152 looks the header HD of the entirety of the plural streams multiplexed into the multiplexed stream StrM, to judge whether each of the streams includes pixel information or not, and outputs the judgement result to the object number extraction means 151. The object number extraction means 151 reads the overlap information Odr included in MHD of the input multiplexed stream StrM to output the same to the controller CPU, as well as extracts the object number of a stream which is subsequent to MHD, and exerts the control so as to switch a switch SW15 for each object number and demultiplex the multiplexed plural streams to output the same. When the pixel information presence/absence judge means 152 judges that a stream of any object number includes no pixel information, the object number extraction means 151 receives this judgement result, and switches the switch SW15 to a non-output terminal (the lowest terminal in the figure) when it has extracted the object number of the stream which has been judged to include no pixel information, to exert the control so as not to output the stream including no pixel information, i.e., the video stream having only the shape, to the decoder Dec in the next stage.

As described above, the video decoding system of the fourth embodiment judges whether a target stream in a step of demultiplexing a multiplexed stream StrM into plural streams includes pixel information or not, and does not output a stream including no pixel information to the decoder Dec in the next stage, thereby preventing display of unnatural pixel values in the case where a video stream having only the shape is input.

[Embodiment 5]

When a program for implementing the operation of the video decoder according to any of the first to third embodiments is recorded in a storage medium, such as a floppy disk, the process according to any of the aforementioned embodiments can be easily implemented in an independent computer system.

FIGS. 6(a)–6(c) are diagrams for explaining a case where a video decoding method corresponding to the video decoder according to any of the first to third embodiments is executed by a computer system using a floppy disk which contains the program for implementing the operation of the video decoder according to any of the first to third embodiments.

FIG. 6(b) shows a front view of a floppy disk corresponding to a video decoding program storage medium, a cross-sectional view thereof, and a floppy disk body FD. FIG. 6(a) shows an example of a physical format of the floppy disk body FD as a storage medium body. The floppy disk is composed of the floppy disk body FD and a case F which contains the floppy disk body FD. On the surface of the disk body FD, a plurality of tracks Tr are formed concentrically from the outer circumference of the disk toward the inner circumference. Each track is divided into 16 sectors (Se) in the angular direction. Therefore, in the floppy disk containing the above-mentioned program, data of the program for the video decoding method are recorded in the assigned sectors on the floppy disk body FD.

FIG. 6(c) shows a structure for recording/reproducing the program onto/from the floppy disk FD. When the program is recorded in the floppy disk FD, data of the program for the video decoding method are written in the floppy disk FD from the computer system Cs through the floppy disk drive FDD. When the above-mentioned video decoding method is constructed in the computer system Cs by the program recorded in the floppy disk FD, the program is read from the floppy disk FD by the floppy disk drive FDD and then loaded to the computer system.

FIGS. 7(a)–7(c) are flowcharts for explaining the process by the video decoding program which is loaded and executed in the computer system.

FIG. 7(a) shows the process of the video decoding program when the video decoding method which is executed by the video decoder of the first embodiment shown in FIG. 1 is realized by the computer system. As shown in this figure, a video stream is input in step S1. In step S2, the input video stream is decoded. In step S3, it is judged whether this stream has only a shape signal or not. When the judgement result is NO, the decoded pixel signal and shape signal are output to the video composition step (not shown) (step S4) When the stream has only the shape signal, a signal indicating that the stream is transparent, i.e., this is not displayed, is created, and output in place of the decoded result of the shape signal, to the video composition step (not shown) (step 5).

FIG. 7(b) shows the process of the video decoding program when the video decoding method executed by the video decoder of the second embodiment shown in FIG. 2 is realized by the computer system. As shown in this figure, a video stream is input in step S1. In step S2, this video stream is decoded. In step S3, it is judged whether this stream has only a shape signal or not. When the judgement result is NO, the decoded pixel signal and shape signal are output to the video composition step (not shown) (step S4). The above-mentioned processes are the same as those in FIG. 7(a). When it is judged in step S3 that the stream has only the shape signal, a predetermined pixel value such as gray is created, and this pixel value is output in place of the decoded result of the shape signal, to the video composition step (not shown) (step S6).

FIG. 7(c) shows the process of the video decoding program when the video decoding method executed by the video decoding system of the third embodiment shown in FIG. 3 is realized by the computer system. The processes from steps S1 to step S4 are the same as those in FIG. 7(a). When it is judged in step S3 that the stream has only the shape signal, a command is created for aborting the composition of the video for that stream, and this command is output to the display end, i.e., the video composition step (not shown) (step 7).

Although in the above description a floppy disk is employed as the storage medium, a magnetic disk, an optical disk, and a magneto-optical disk, such as hard disk, may be employed. The storage medium is not restricted to these disks, and any medium may be employed as long as it can contain the program, for example, a semiconductor storage device, such as an IC card or a ROM cassette.

What is claimed is:

1. A video decoding method for receiving a stream including at least one of information obtained by coding pixel values which compose a video and information obtained by coding shape values indicating whether or not the pixel values which compose the video are significant, and outputting at least one of the pixel values and the shape values, which are respectively obtained by decoding the stream, the video decoding method comprising:

judging whether or not the stream includes the information obtained by coding the pixel values which compose the video; and preventing a displaying of decoded pixel values on a video display unit, when the stream includes the information which is obtained by coding the shape values and does not include any information which is obtained by coding the pixel values.

2. The video decoding method of claim 1, further comprising:

converting the decoded shape values into shape values which are not displayed to output the shape values, when the stream does not include any information obtained by coding the pixel values.

3. The video decoding method of claim 1, further comprising:

outputting a signal which inhibits displaying a decoded result on the video display unit, when the stream does not include any information which is obtained by coding the pixel values.

4. The video decoding method of claim 1, wherein the video is one of a plurality of videos of objects which compose a foreground with respect to a background.

5. A video decoding method for receiving a stream including at least one of information obtained by coding pixel values which compose a video and information obtained by coding shape values indicating whether or not the pixel values which compose the video are significant, and outputting at least one of the pixel values and the shape values, which are respectively obtained by decoding the stream, the video decoding method comprising:

outputting predetermined values as the decoded pixel values, when the stream includes the information which is obtained by coding the shape values and does not include any information obtained by coding the pixel values.

6. A video decoding method for receiving a stream including at least one of information obtained by coding pixel values which compose a video and information obtained by coding shape values indicating whether or not the pixel values which compose the video are significant, and handling the stream, the video decoding method comprising:

judging whether or not the stream includes the information obtained by coding the pixel values which compose the video; and preventing a decoding of the stream, when the stream includes the information which is obtained by coding the shape values and does not include any information which is obtained by coding the pixel values.

7. A video decoding apparatus comprising:

a video decoder for receiving a stream including at least one of information obtained by coding pixel values which compose a video and information obtained by coding shape values indicating whether or not the pixel values which compose the video are significant, and outputting at least one of the pixel values and the shape values, which are respectively obtained by decoding the stream; and a display controller for judging whether or not the stream includes the information obtained by coding the pixel values which compose the video, and exerting a control not to display the pixel values as an output of the video decoder, when the stream includes the information which is obtained by coding the shape values and does not include any information which is obtained by coding the pixel values.

8. The video decoding apparatus of claim 7, wherein the video is one of a plurality of videos of objects which compose a foreground with respect to a background.

9. A video decoding program located on a storage medium for implementing a video decoding method for receiving a stream including at least one of information obtained by coding pixel values which compose a video and information obtained by coding shape values indicating whether or not the pixel values which compose the video are significant, and outputting at least one of the pixel values and the shape values, which are respectively obtained by decoding the stream, the video decoding program implementing the video decoding method comprising:

judging whether or not the stream includes the information obtained by coding the pixel values which compose the video; and preventing a displaying of decoded pixel values on a video display unit, when the stream includes the information which is obtained by coding the shape values and does not include any information which is obtained by coding the pixel values.

10. The video decoding program of claim 9, wherein:

the video is one of a plurality of videos of objects which compose a foreground with respect to a background.

* * * * *